Feb. 2, 1965 A. PIOVESAN 3,168,620

ELECTROMECHANICAL DEVICE FOR RECORDING AND REPRODUCING TELEPHONE MESSAGES RECEIVED IN THE ABSENCE OF THE SUBSCRIBER

Filed Sept. 5, 1961 2 Sheets-Sheet 1

INVENTOR.
Arnaldo Piovesan
BY
[signature]
Agent

INVENTOR.
Arnaldo Piovesan
BY [signature]
Agent

United States Patent Office 3,168,620

Patented Feb. 2, 1965

3,168,620

ELECTROMECHANICAL DEVICE FOR RECORDING AND REPRODUCING TELEPHONE MESSAGES RECEIVED IN THE ABSENCE OF THE SUBSCRIBER

Arnaldo Piovesan, % Guido Modiana, via Meravigli 16, Milan, Italy

Filed Sept. 5, 1961, Ser. No. 137,710
Claims priority, application Italy, Dec. 31, 1960, 643,198
1 Claim. (Cl. 179—6)

Figure 1:
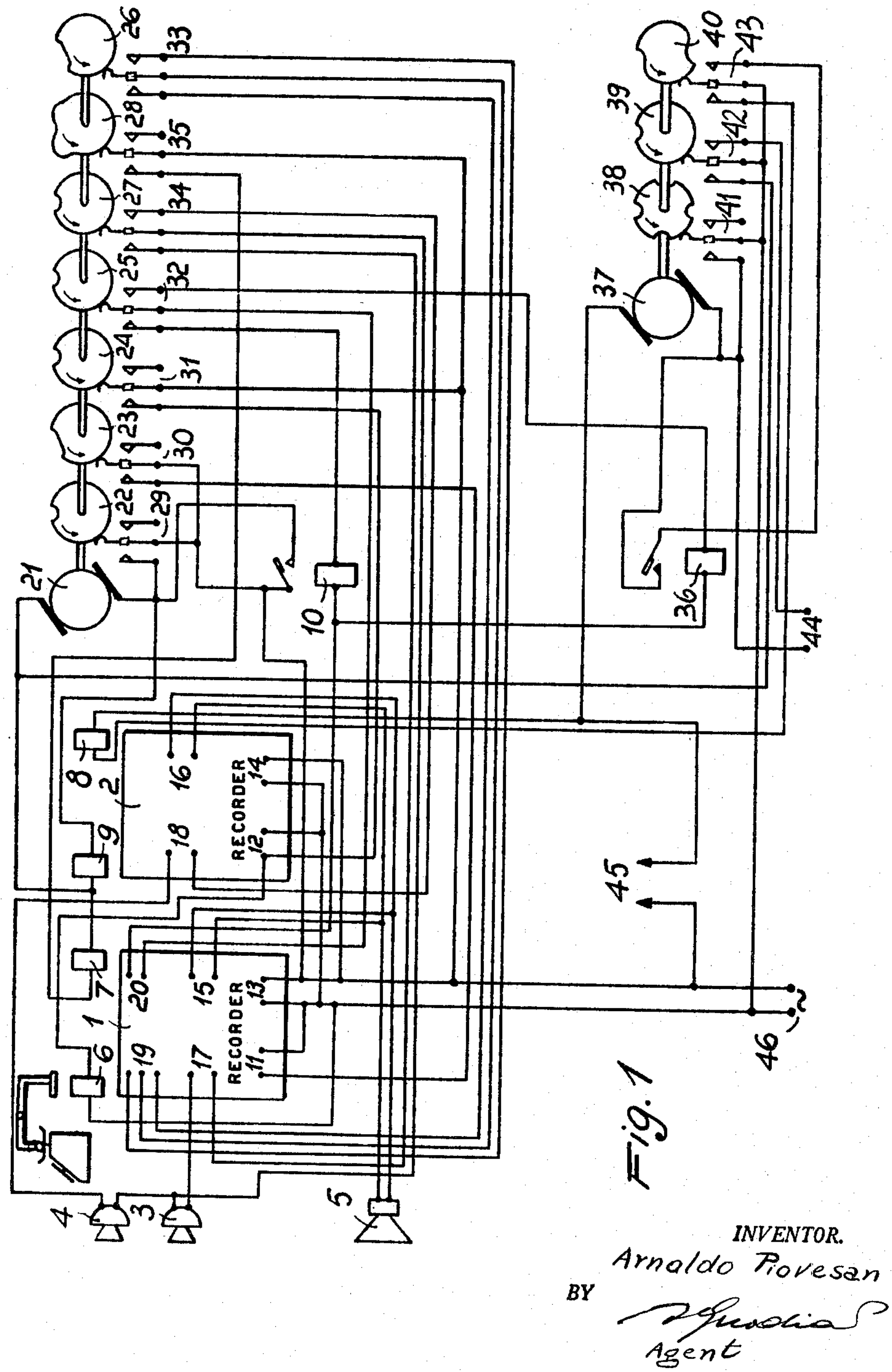

The present invention relates to an electromechanical device which permits telephone conversations that take place in the absence of the subscriber to be recorded and subsequently reproduced or played back, without tampering the telephone instrument nor the telephone network.

It is known that electromagnetic recording instruments, commonly known as magnetic recorders, such as tape recorders, usually employ a magnetic storage means such as a magnetic tape for recording the acoustic signals, and that their functioning is controlled basically by the manipulation of a recording key, a play-back key and another key for rewinding the magnetic tape. The magnetic tape is generally driven by means of a small electric motor, whilst the acoustic signals are picked up by a microphone which transforms them into electrical signals that are suitably amplified by the electronic circuits making up the recording instrument itself.

There are already on the market substantially electromechanical apparatuses which enable telephone messages to be recorded in the absence of the subscriber, but such known apparatuses have many disadvantages whereof the most notable is that they require devices of considerable complexity both from the electrical and from the mechanical points of view.

Moreover they do not in general allow the absent subscriber to listen from another telephone to all the messages recorded on his own instrument, simply by calling up his own telephone while making it impossible for this operation to be carried out by any unauthorized person.

One of the objects of the present invention is to provide an apparatus that is simple from the functional and constructional points of view, for enabling a telephone message made in the absence of the subscriber to be automatically recorded for subsequent playback.

Another object of the invention is to enable the absent subscriber to listen to the messages received by his own instrument by calling up his own number from any other telephone.

Still another object is to provide an apparatus which does not require for its functioning any tampering of the telephone instrument nor the telephone network whereto it is connected.

These and other objects are achieved by the device according to the invention which is characterized in that it comprises at least one recorder whereon there is recorded a conventional phrase in answer to a telephone call, at least one recorder whereon the messages received in the absence of the subscriber are recorded, substantially electromagnetic means for picking up and emitting the acoustic signals, and substantially electromechanical means for pre-setting the telephone instrument to receive a message, pre-setting the recorders to record and reproduce or play back, and cyclically restoring the apparatus to its initial positions in order to permit a fresh telephone call to be recorded.

According to the invention the apparatus can also with advantage include substantially electromechanical means which, when automatically activated by a clockwork mechanism previously set up by the subscriber, allow said subscriber to listen to the messages received by his telephone instrument and recorded by the recorder, by calling from any other telephone during a pre-arranged period and making a conventional signal. Said means comprise substantially an electromechanical device which causes the magnetic tape of the recorder which picked up the messages to be re-wound, a stopping device, a device for setting said recorder to play back, and means for feeding the recorded signals into the microphone of the telephone instrument without tampering said telephone instrument.

Figure 2:
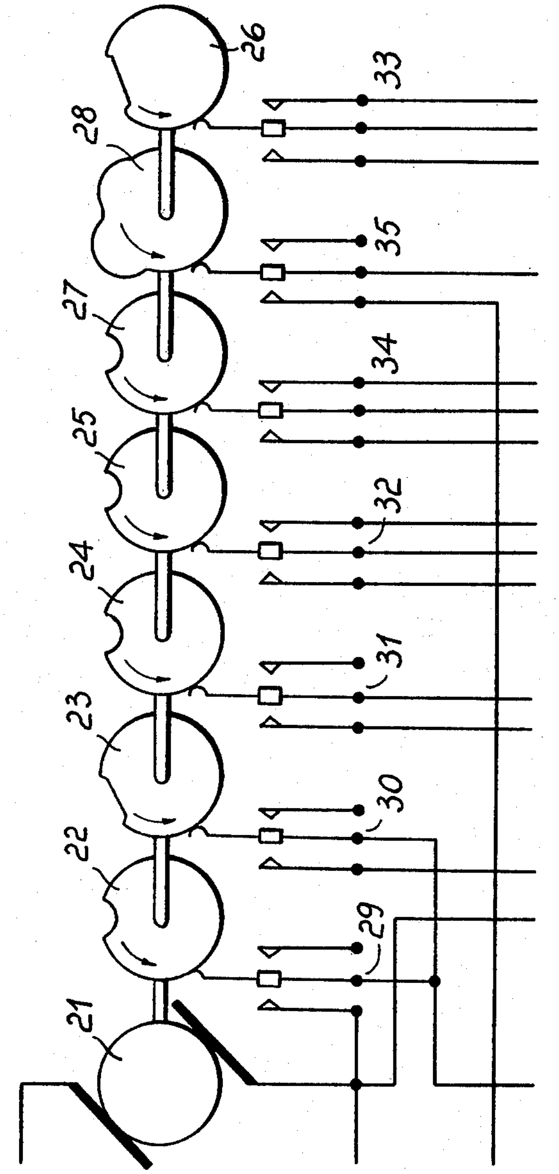

The device according to the invention will now be described more fully with reference to the accompanying drawing which is given purely for illustrative purposes and wherein:

FIG. 1 shows a general electromechanical diagram of the device;

FIG. 2 gives a diagrammatic indication of the profiles of the various mechanical devices (cams).

With reference to the aforesaid figures, the numeral 1 indicates a first tape recorder on the magnetic tape whereof there has been previously recorded a conventional phrase which will be transmitted as a reply to a telephone call; the numeral 2 indicates a second tape recorder on the magnetic tape whereof incoming telephone messages will be recorded. The numeral 3 indicates a microphone, 4 a second microphone, and 5 a loudspeaker. Microphone 3 is connected to terminals 17 of tape recorder 1, while microphone 4 is connected to terminals 18 of tape recorder 2 and, at the same time, to terminals 17. Loudspeaker 5 is in circuit at 15 with tape recorder 1 and at 16 with tape recorder 2, and represents the amplified outlets of said tape recorders. The numeral 6 indicates an electromagnet which causes the fork rest of the telephone to be raised, the numeral 7 indicates an electromagnet which switches on the rewinding of the magnetic tape of tape recorder 1, the numeral 8 an analogous electromagnet for re-winding the tape of the tape recorder 2, while the numeral 9 indicates an electromagnet which switches on the recording operation by tape recorder 2. The numeral 10 indicates a relay which receives an amplified electrical signal from terminals 20 of tape recorder 1, corresponding to the ringing of the telephone bell which is picked up by microphone 3 and put through 17 into said tape recorder 1. Said relay closes the input circuit to the timing motor 21 which puts into operation the electromechanical devices which carry out in a determined time all the operating sequences of the apparatus. Numerals 11 and 12 indicate respectively the input terminals of the motors driving the magnetic tapes on tape recorders 1 and 2. Numerals 13 and 14 indicate the input terminals from the main supply to the two tape recorders hereinabove referred to, whilst terminals 15 represent the outlet from tape recorder 1 leading to the same loudspeaker 5 whereto the output from tape recorder 2 is also connected through the terminals indicated by the numeral 16. The numeral 19 indicates terminals which, through microswitch 33, serve the purpose of selectively switching the amplifier of tape recorder 1, which functions initially to amplify the signal coming from microphone 3 and direct it to relay 10, over to amplifying the signal recorded on the magnetic tape so as to send the conventional answering phrase to loudspeaker 5 through terminals 15 and thence to the microphone of the microtelephone of the telephone instrument (not shown).

Numerals 22, 23, 24, 25, 26, 27 and 28 represent cams driven by the small timing motor 21, which, during a 360° revolution of said timing motor 21 occupying a predetermined time, perform all the working sequences of the apparatus by acting on microswitches 29, 30, 31, 32, 33, 34 and 35. Cams 23–28 may be keyed in known manner on a common shaft driven by the timing motor 21. To go into detail, as soon as motor 21 starts to move, microswitch 29 which is driven by cam 22 closes the self-energizing circuit of the motor itself and the circuit feeding electromagnet 9. Microswitch 30, when actuated by cam 23, closes the feed circuit of the motor driving the tape of tape recorder 1. Microswitch 31 when actuated by cam 24, closes the feed circuit of the motor of tape recorder 2 and the circuit of electromagnet 6 which raises the fork rest of the telephone instrument (not shown in the figure). When actuated by cam 25, microswitch 32, which is in circuit with relay 10, switches the signal coming from terminals 20, from relay 10 to relay 36 which closes the feed circuit of small motor 37 which drives another series of cams shown in 38, 39 and 40. Cams 38, 39 and 40 may be keyed on a common shaft, driven by the motor 37.

Microswitch 34 actuated by cam 27 first closes the circuit of microphone 3 on terminals 17 of tape recorder 1, and then cuts out said microphone 3 and simultaneously switches in microphone 4 at 17 on tape recorder 1 and at 18 on tape recorder 2. Microswitch 35, when actuated by cam 28, closes the circuit feeding electromagnet 7 which controls the rewinding of the magnetic tape of tape recorder 1.

Microswitch 33, when actuated by cam 26, acts on terminals 19, that is, it switches the amplifier of tape recorder 1 from the circuits of relay 10 or 36 on to the audio circuit of tape recorder 1 in order to play back the conventional phrase recorded on the magnetic tape of the aforesaid tape recorder, into loudspeaker 5.

The numeral 45 indicates contacts which are automatically closed during pre-determined time intervals by a clockwork device which is in itself known and is not shown. Said contacts pre-set the feed circuits of electromagnet 8 for rewinding the magnetic tape of tape recorder 2, of motor 37, for the actuation of cams 38, 39 and 40, and thence of microswitches 41, 42 and 43, and of contact 44 so as to enable the absent subscriber to listen from another telephone instrument to the messages that have arrived at his home. To go into greater detail, microswitch 41, when actuated by cam 38, allows motor 37 to be self-energized; microswitch 42, when actuated by cam 39, keeps the circuit of motor 21 and electromagnet 9 closed, when in the rest position, and opens the aforesaid circuits and brings a voltage to contacts 44 which are controlled by a mechanical device connected with the unwinding of the magnetic tape of tape recorder 2, when in the operating position.

Microswitch 43, when actuated by cam 40, opens the starting circuit of motor 37 and provides tension to electromagnet 8 which causes the rewinding of the magnetic tape of tape recorder 2. The apparatus works as follows when recording an ordinary message:

The telephone instrument is arranged so that microphone 3 is near to the bell, microphone 4 is near to the earphone and loudspeaker 5 is near to the microphone of the microtelephone. When a telephone call arrives, the ringing of the bell is captured by microphone 3, fed at 17 into tape recorder 1, transformed into an electrical signal by the amplifier of tape recorder 1 and sent through terminals 20 and microswitch 32 to energize relay 10. The latter closes the feed circuit of motor 21 which puts the cams and hence the whole apparatus into operation. Immediately afterwards cam 22 comes into action which through microswitch 29, closes the self-energizing circuit of motor 21 and that of electromagnet 9 which pre-sets tape recorder 2 for recording. At the same time cam 27, by means of microswitch 34, cuts out microphone 3 from terminals 17 and switches in microphone 4 at said terminals 17 and at terminals 18 of tape recorder 2. At the same time cam 26, acting on microswitch 33, switches through terminals 19 the output of the amplifier of tape recorder 1 from terminals 20 to terminals 15 leading to loudspeaker 5, whilst cam 24, acting on microswitch 31, closes the circuit of the motor of tape recorder 2 at 12 and that of the electromagnet which raises the fork rest of the telephone at 6. Cam 23, through microswitch 30, closes at 11 the feed circuit of the motor of tape recorder 1 which, as it is pre-set for playing back, sends the conventional phrase through terminals 15 to loudspeaker 5 and then to the microphone of the telephone (not shown). Tape recorder 2 has already been pre-set for recording as electromagnet 9 has come into action and contacts 12 feeding the motor have been closed. The caller's message is then recorded through the telephone whose earphone is in contact with microphone 4 which is connected at 18 to tape recorder 2.

Microphone 4 is also connected to tape recorder 1 at 17, but said tape recorder s in the play-back position so that, during this stage, said microphone produces no effect on tape recorder 1.

In the meantime, as the conventioal phrase has been transmitted, cam 38 and microswitch 35 operate to close the circuit of electromagnet 7 which causes the tape of tape recorder 1 to be rewound and set ready for playing another time. After the interval of time pre-determined by timing motor 21 has elapsed, cams 22, 23, 24, 25, 26, 27 and 28 will have revolved through 360° and returned to their starting positions; in particular, cam 22 will open microswitch 32 thus stopping motor 21 and concluding the cycle of operations.

Whenever the absent subscriber wishes to listen from any other telephone to the messages that have arrived at his telephone during his absence, he calls in one of those intervals of time during which the clockwork device which he has pre-set and made operative, is keeping contact 45, which feds the circuits of motors 37 and electromagnet 8, closed. The telephone call is received as in the previous case, the conventional phrase is transmitted and motor 21 is set in motion; at a certain point during the cycle of operations, cam 25 acts on microswitch 32 and shifts the signal coming from terminals 20, from relay 10 to relay 36. At the same time cam 26, acting on microswitch 33, switches the amplifier of tape recorder 1 from the play-back position, i.e. with the output at 15, to the recording position, i.e. with the output at 20. If the subscriber transmits a certain signal this is picked up by microphone 4 and recorded on tape recorder 2, which is functioning normally, but at the same time releases a pulse to terminals 20 whence it arrives at relay 36. The latter closes the feed circuit of timing motor 37 thus causing cams 38, 39 and 40 to operate.

Cams 38 act on microswitch 41, closing the self-energizing circuit of timing motor 37. During the first quarter of a revolution of said cam 38, cam 39, acting on microswitch 42, opens the feed circuit of motor 21, stopping it and simultaneously putting contacts 44 under tension. Cam 40, acting on microswitch 43, opens the circuit of timing motor 37, stopping it and simultaneously closing the feed circuit of electromagnet 8 which cause the tape of tape recorder 2 to be rewound. When the tape is completely rewound, a mechanical device connected to the magnetic tape closes contacts 44 and starts off timing motor 37 again. Cam 40, through microswitch 43, opens the circuit of electromagnet 8 and so pre-sets tape recorder 2 for playing back. The user will then listen through loudspeaker 5 which is in direct contact with the telephone microphone, to whatever has been recorded on the tape. When he has finished listening, the user may restart motor 37 by a fresh signal, or he can replace the microtelephone. In the later case the magnetic tape continues to unwind up to the end; at this point a mechanical device of any known type connected with the tape acts once again on contacts 44 and restarts timing motor 37. The sequence of operations is reproduced as in the initial stage and, in particular, electromagnet 8, operated by microswitch 43, rewinds the tape completely. On completion of rewinding contacts 44 start motor 37 again for the last time thus bringing cams 38, 39 and 40 back to their starting positions; in particular, timing motor 21 is again energized through microswitch 42, thus carrying to completion the cycle of the remaining cams and restoring the apparatus in readiness to handle another call.

The device according to the invention may have many embodiments which may be different from that illustrated, and in particular, the recording instruments can be of the disc type instead of the tape type.

The timing devices can be of mechanical or electrical type according to need and convenience.

I claim:

An electromechanical device for reproducing conventional messages and for recording telephone messages upon a telephone call in the absence of the subscriber and for reproducing the recorded messages over a telephone line in response to an order signal received over the same telephone line, comprising:

a first magnetic recorder for answering a recorded conventional phrase upon an external telephone call;

a second magnetic recorder for recording incoming external messages and reproducing them over a telephone line in predetermined time intervals upon an order signal received over the telephone line;

a first microphone connected to said first magnetic recorder and adapted to pick-up the acoustic signals from the telephone bell;

a second microphone connected to said second magnetic recorder and adapted to pick-up the messages transmitted over the telephone line upon the telephone call;

a loud speaker alternatively connectable to said first and said second magnetic recorder;

an electromagnet for raising the fork rest of the telephone apparatus;

a first rewinding relay to switch the rewinding of said first magnetic recorder;

a second rewinding relay to switch the rewinding of said second magneitc recorder;

a recording relay for switching the recording operation of said second magnetic recorder;

a signal relay connected with said first magnetic recorder and responsive to a calling signal transmitted thereto from an amplifier of said first magnetic recorder upon the ringing of the telephone bell picked-up by said first microphone and transmitted to said amplifier;

a first timing motor, said signal relay when energized controlling the start of said timing motor;

a first cam shaft connected with said first timing motor;

a first plurality of micro-switches actuated by said first cam shaft and controlling the pre-setting sequences of the magnetic recorders for reproducing the conventional message and for recording the messages received over the telephone line;

a second timing motor;

a second cam shaft connecting with said timing motor;

a second plurality of micro-switches actuated by said second cam shaft and controlling the pre-setting sequences for reproducing the recorded messages upon the receipt of an order signal at a predetermined time interval over the telephone line;

a play-back relay for closing the feed circuit of said second timing motor;

normally open clock-work actuated contact means for closing the feed circuit of said second timing motor at predetermined time intervals and responsive to an order signal, mechanically actuated second contact means for closing the feed circuit of said second timing motor when said second recorder is completely rewound.

References Cited by the Examiner

UNITED STATES PATENTS

| | | | |
|---|---|---|---|
| 2,773,123 | 12/56 | Handschin | 179—6 |
| 2,935,566 | 5/60 | Karl | 179—6 |

IRVING L. SRAGOW, *Primary Examiner.*

BERNARD KONICK, *Examiner.*